United States Patent
Takayama et al.

(12) 
(10) Patent No.: US 6,428,744 B1
(45) Date of Patent: Aug. 6, 2002

(54) SLIDING CONTACT MATERIAL, SLIDING CONTACT ELEMENT AND PRODUCING METHOD

(75) Inventors: Takemori Takayama; Yoshikiyo Tanaka, both of Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/660,585

(22) Filed: Sep. 12, 2000

Related U.S. Application Data

(62) Division of application No. 09/235,496, filed on Jan. 22, 1999.

(30) Foreign Application Priority Data

Jan. 28, 1998 (JP) .............................................. 10-32198

(51) Int. Cl.⁷ ................................................. B22F 3/00
(52) U.S. Cl. ................................ 419/2; 419/26; 419/60
(58) Field of Search ................................ 419/2, 27, 60

(56) References Cited

U.S. PATENT DOCUMENTS

| | | | | |
|---|---|---|---|---|
| 4,307,998 A | * | 12/1981 | Nakayama et al. | 417/269 |
| 5,183,637 A | * | 2/1993 | Tanaka et al. | 420/479 |
| 5,334,460 A | * | 8/1994 | Tanaka et al. | 428/552 |
| 5,817,397 A | * | 10/1998 | Kamiya et al. | 428/141 |
| 5,948,549 A | * | 9/1999 | Takayama et al. | 428/676 |
| 6,197,432 B1 | * | 3/2001 | Fujita et al. | 428/553 |

FOREIGN PATENT DOCUMENTS

| | | |
|---|---|---|
| JP | 3-232905 | 10/1991 |
| JP | 5-156388 | 6/1993 |
| JP | 8-291306 | 11/1996 |

* cited by examiner

*Primary Examiner*—Ngoclan Mai
(74) *Attorney, Agent, or Firm*—Armstrong, Westerman, & Hattori, LLP.

(57) ABSTRACT

There are disclosed copper-base and/or iron-base contact materials which contain a Pb intermetallic compound dispersedly precipitated therein and which have highly improved sliding properties. Double layered contact elements improved in oil impregnation and lubricity are formed by sinter bonding the above contact materials to an iron-base metal backing, respectively. Economical producing methods for such double layered contact materials are also disclosed. In the copper-base and/or iron-base contact materials, one or more kinds of Pb intermetallic compounds are dispersedly precipitated.

13 Claims, 14 Drawing Sheets

FIG. 1

Pb INTERMETALLIC COMPOUND PERIODIC TABLE

| 1A | 2A | 3A | 4A | 5A | 6A | 7A | 8 | 8 | 8 | 1B | 2B | 3B | 4B | 5B | 6B | 7B | 0 |
|---|---|---|---|---|---|---|---|---|---|---|---|---|---|---|---|---|---|
| H | | | | | | | | | | | | | | | | | He |
| Li LiPb,I | Be | | | | | | | | | | | B | C | N | O | F | Ne |
| Na NaPb₃ | Mg Mg₂Pb | | | | | | | | | | | Al B | Si B | P – | S PbS | Cl | Ar |
| K KPb₄ | Ca CaPb₃ | Sc Ca₂Pb | Ti Ti₄Pb, | V | Cr B | Mn B | Fe B | Co B | Ni B | Cu B | Zn C | Ga B | Ge A | As – | Se SePb | Br | Kr |
| Rb | Sr SrPb₃ | Y | Zr Zr₅Pb₃ | Nb | Mo B | Tc | Ru | Rh RhPb₃ | Pd PdPb₂ | Ag A | Cd A | In α | Sn A | Sb A | Te TePb | I | Xe |
| Cs | Ba BaPb₃ | La LaPb₃ | Hf | Ta | W | Re | Os | Ir IrPb | Pt PtPb₄, | Au AuPb₂. | Hg HgPb₂ | Tl C | Pb | Bi ε | Po | At | Rn |
| Fr | Ra | Ac | | | | | | | | | | | | | | | |
| CePb₃,Ce₂Pb | | Pr₂Pb,PrPb₃ | | PrPb₃ | | PuPb₃ | PbSe(1088°C) GdPb₃ | | | UPb₃,UPb | | | ThPb₃,ThPb | | SmPb₃ | | |

MICROPHOTOGRAPHS OF METALLOGRAPHIC STRUCTURES AT AREAS CLOSE TO
THE JOINT INTERFACE OF CONTACT MATERIAL AND METAL BACKING

No. 2
(x400)

No. 2
(x400)

No. 9
(x400)

CONCEPTUAL VIEW OF TESTER (a) AND TEST CONDITIONS (b)

① SHAFT: S45C + HIGH FREQUENCY HARDENED MATERIAL
② BUSHING SAMPLE
③ THERMOCOUPLE

GREASE: LITHIUM GREASE
ROCKING ANGLE: 180°
ROTATIONAL SPEED: ±6PRM
SURFACE PRESSURE: Max800kg/cm²
COUNTER SHAFT MATERIAL: S45C + HIGH FREQUENCY HARDENED MATERIAL

MICROPHOTOGRAPH OF METALLOGRAPHIC STRUCTURE OF DOUBLE LAYERED
SINTERED CONTACT ELEMENT HAVING No. 22 IRON-BASE SINTERED INSERT LAYER

DIAGRAM SHOWING HOW SURFACE OF SINTER
BONDED INSERT LAYER COARSENS

AFTER SPRAYING OF IRON-BASE
POWDER(POROSITY RATIO=60%)

AFTER FIRST SINTERING

RESULT OF SLIDING TEST CONDUCTED ON DOUBLE LAYERED SINTERED
CONTACT ELEMENT HAVING IRON-BASE INSERT LAYER

AN EXAMPLE OF PUNCHED CONTACT ELEMENT

D : 8.0mm  P = 16mm

RATE OF HOLE AREA =22.5%

MAXIMUM LENGTH IN SLIDING DIRECTION =19.7mm

MICROPHOTOGRAPH OF METALLOGRAPHIC STRUCTURE OF DOUBLE LAYERED
SINTERED CONTACT ELEMENT OBTAINED IN EMBODIMENT 5

SLIDING CONTACT MATERIAL, SLIDING CONTACT ELEMENT AND PRODUCING METHOD

This application is a Divisional of prior application Ser. No. 09/235,496 filed on Jan. 22, 1999.

TECHNICAL FIELD

The present invention generally relates to sliding contact materials, sliding contact elements and sliding contact element producing methods, which are directed to achieving improved wear resistance under higher surface pressure conditions and the capability of noise prevention. More particularly, the invention relates to copper-base and/or iron-base sliding contact materials in which a Pb intermetallic compounds is dispersedly precipitated to improve sliding properties and relates to double layered sliding contact elements produced by sinter-bonding such sliding contact materials to an iron-base metal backing in an integral fashion thereby improving oil impregnation properties and lubricity. The invention also relates to economical methods for producing such double layered sliding contact elements. Hereinafter, sliding contact materials and sliding contact elements are simply referred to as "contact materials" and "contact elements".

BACKGROUND ART

Bronze materials such as Cu—Sn—Pb and lead-bronze materials are commonly used as materials for copper-base sintered bearings. Such materials are often integrally bonded to an iron-base metal backing to form a double layered sintered contact element such as a track roller provided in the base carrier of a construction machine.

As bearings used under high surface pressure and low speed conditions such as bushings for use in a construction machine, carburized or high-frequency-hardened wear-resistant steel bushings are widely known. When used in a construction machine, a bushing is subjected to high surface pressure and severe lubricating conditions and likely to generate undesirable abnormal noise during operation. To cope with this problem, there are often used high strength brass bushings or the above-described steel bushings which have undergone lubricating film coating treatment. High strength brass bushings are especially attractive because of their superior conformability. To prolong the intervals at which grease is fed to a bearing disposed in a construction machine etc., there has been proposed a graphite-embedded bearing material (e.g., 500SP produced by OILLESS INC.) that is produced by machining a high strength brass bushing to have holes and embedding porous graphite in the holes to be impregnated with oil. For the same purpose, a sintered metal body containing a large amount of solid lubricant (e.g., the SL alloys produced by TOSHIBA TUNGALOY CO., LTD.) is used.

Japanese Patent Publication (KOKOAI) No. 5-156388 (Japanese Patent Publication (KOKOKU) No. 56-12288) discloses a double layered sintered contact element for use under high surface pressure and its producing method. This contact element is formed by integrally bonding an aluminum-bronze-base sintered contact alloy, in which graphite is dispersed as a solid lubricating component within the range of 3 to 8 wt %, to a steel plate through a bonding layer.

Japanese Patent Publication (KOKAI) No. 3-232905 discloses a double layered sintered contact element having superior resistance to high load and impact. This element comprises (i) a metal backing that is made of a steel plate having a plurality of independent protrusions at its surface or steel plate having a series of connected protrusions and a plurality of independent recesses defined by the respective protrusions and (ii) a copper-base sintered alloy layer that is integrally formed with the metal backing so as to cover the protrusions of the surface and in which graphite is dispersed as a lubricating component in an amount of at least 3 wt %. This copper-base sintered alloy layer is composed of a low-density, high-oil-impregnating alloy region and a high-density, low-oil-impregnating alloy region.

Double layered sintered contact elements having a lead-bronze-base or bronze-base sintered contact layer are versatilely used as a sliding contact member of good conformability for the aforesaid lower track roller or engine metal, under low load, high speed and well lubricating conditions. However, they are inadequate for use as a bushing for a construction machine since they are easily worn out or fatigued due to lack of hardness for withstanding the high surface pressure and severe lubricating conditions.

When a steel bushing is used as a bushing in a construction machine, it is not fatigued but likely to cause seizure or unpleasant abnormal noise.

High strength brass contact materials produced by casting are substantially free from fatigue and generate little noise, but easily become short of lubricity. Therefore, they cannot completely prevent noise generation and are unavoidably susceptible to rapid wear when they are used in extremely low speed and high load applications such as when adapted in a construction machine.

Generally, in a high strength brass base contact material formed as a sinter contact alloy, the steam pressure of Zn contained is too high to carry out high density sintering. Therefore, sintering must be carried out under a pressurized condition when producing a double layered sintered contact element from such high strength brass contact material and, in consequence, production cost cannot be reduced.

In the case of steel bushings coated with a lubricating film, formation of a thick lubricating film is generally difficult and expensive and it is therefore apparent that after the lubricating film provided for such bushings is worn out, abnormal noise and seizure occur, like the case of ordinary steel bushings.

The graphite-embedded high strength brass bushing having more self-lubricity (e.g., 500SP produced by OILLESS INC.) requires a punching process for making a large number of holes for graphite embedding as well as a graphite filling process, in order to achieve high self-lubricity, which significantly increases cost. In many cases, the ratio of holes for graphite is normally restricted to 25 to 30% on a basis of area in view of cost, and therefore they cannot provide satisfactory self-lubricity over a long period of time.

The degree of sintering is a problem for a sintered metal body containing a large amount of known solid lubricant such as graphite, BN and $MoS_2$ and therefore a pressure sintering means such as a hot press is required in order to achieve high density, resulting in increased cost. In addition, since the conventionally used solid lubricant is extremely soft, even a high-density metal sintered body suffers from high brittleness.

In the case of the double layered sintered contact element comprising (i) a steel plate serving as a metal backing and having a plurality of independent protrusions or a series of connected protrusions on its surface and (ii) an integral copper-base sintered contact alloy layer containing at least 3 wt % graphite, the steel plate backing formed into a specified shape is expensive and it is extremely difficult and costly to manufacture a metal backing which has protrusions (high-density portions) for sustaining a bearing load, in an area ratio of 30% or more.

Additionally, when bending the above material to produce a tubular bushing, bending stress is concentrated on the protrusions of the steel plate which are harder than other areas, so that exfoliation is likely to occur in the joint interface between the steel plate and the copper-base sintered contact material and the deformation resistance occurring in the bending operation is unevenly distributed in the steel plate. This makes it difficult to uniformly bend the material into a tubular shape. In consequence, a lot of machining work is involved in producing a tubular bushing, and the cost for inspecting the quality of bonding between the contact material and metal backing of the final product increases.

The invention is directed to overcoming the foregoing problems. Therefore, an object of the invention is to provide copper-base and/or iron-base contact materials in which Pb intermetallic compounds are dispersedly precipitated to achieve highly improved sliding properties. Another object of the invention is to provide double layered contact elements and their economical producing methods, the contact elements being produced by sinter-bonding the above contact materials to an iron-base metal backing in an integral fashion and being improved in oil impregnation and lubricity.

DISCLOSURE OF THE INVENTION

To achieve the above objects, the invention includes the following technical means.

According to a first aspect of the invention, there are provided copper-base contact materials and copper-base and/or iron-base sinter contact materials, which are softer and more conformable than the above-described conventional steel bushing material, and which are basically Cu—Pb—Ti alloys and —Mg alloys having high seizure and wear resistance like high strength brass material, which alloys contain a Pb intermetallic compound dispersedly precipitated therein by virtue of the presence of Ti or Mg.

In contrast with the conventional lead-bronze base contact materials and iron-base sinter contact materials in which Pb is dispersedly precipitated simply as a metal component, the contact material of the invention contains Pb dispersed in the form of a Pb intermetallic compound. With this arrangement, the sliding properties of the contact material under high surface pressure and severe lubricating conditions can be highly improved. Since Pb is dispersedly precipitated in the form of a Pb intermetallic compound, the contact material may contain Pb at least in the range of from 1 to 30 wt %. This Pb range is wider compared to the case where Pb is precipitated as a metal.

As counter metallic elements which strongly combine with Pb to form an intermetallic compound, 1A, 2A, 3A, 4A and 6B groups in the periodic table shown in FIG. 1, lanthanides and actinides may be used in combination, but Ti, Mg, Ca, Ba, Zr, Li, Hf, La, Te, Se, Sm are preferable in view of cost and availability. Besides, Ti, Mg and Zr are more preferable for the above reason. The same effect can be expected when other elements than the above are used for forming a Pb intermetallic compound.

Although the contents of the above metallic elements can be calculated from the molar ratio of a Pb intermetallic compound such as $CaPb_3$, they needs to be contained in amounts of substantially 0.5 wt % or more.

Accordingly, the bronze-base sinter contact material is especially important, which is designed to contain Ti and Mg in an amount of 0.5 to 10 wt % in order to improve strength, sliding properties and cost performance and to further contain Sn in an amount of 1 to 10 wt % in order to ensure bonding strength relative to a metal backing and facilitate sintering operation.

The upper limit of the amount of Ti and Mg is preferably 10 wt % in view of cost.

Since it is known that the amount of a Pb intermetallic compound which contributes to seizure resistance is about 0.5% by volume in the case of conventional contact materials containing dispersed hard particles, the amount of Pb is preferably 1 wt % or more and the upper limit of Pb is preferably 30 wt % in view of strength. Taking the environmental problems imposed by Pb in the sintering process into account, the amount of Pb should be restricted to 15 wt % or less. Further, copper-base contact materials containing Ti are known to react to precipitate other Ti intermetallic compounds than the intermetallic compounds of Ti and Pb and undergo age hardening. It is also known that the strength and hardness of Ti-containing copper-base contact materials can be improved by adding alloy elements such as Al, Ni, Si, Fe, Mn, Cr, Be and the like. In view of these facts, it is appropriate to contain Ti within the range of up to 5 wt % in order not to impair sintering properties.

It is apparent that the addition of the above metallic elements having the ability of forming a Pb intermetallic compound enables fining of Cu-base sinter alloy structures and in consequence the uniform dispersion of Pb, providing excellent sliding properties.

The appropriate amount of Ti is 0.5 wt % or more by which a Ti intermetallic compound precipitates and the upper limit of the amount of Ti is preferably 10 wt % in view of cost. For producing a construction machine bushing or the like for use under high surface pressures, the more preferable amount of Ti is 2 wt % or more, taking the hardness (Hv=150 or more according to the actual record) of high strength brass bushings into account.

In conventional contact materials containing dispersed hard particles, remarkably stable sliding properties can be admitted when 0.5% by volume of hard particles are dispersed. Therefore, the amount of Pb is 1 wt % or more and, more preferably, 5 to 10 wt % when converted to a Pb intermetallic compound basis.

It is obvious that the same inventive factors as those of the above copper-base sinter contact materials can be achieved by cast materials. Accordingly, the scope of the invention covers the case where a cast material is machined and formed into the copper-base contact element having improved sliding properties.

According to the invention, the copper-base contact materials prepared by casting and the copper-base and/or iron-base sintered contact materials prepared by sintering may be designed, in consideration of the surface pressure imposed on these materials during operation and the intervals at which grease is supplied, to have 10 to 70% holes on an area ratio basis and contain grease or oil impregnated plastics embedded in the holes. The invention also covers the case where a copper-base sinter material powder which is expandable by sintering is introduced in the holes of the copper-base and/or iron-base contact materials and sintering is carried out to form a porous sintered body excellent in oil impregnation so as to be bonded to the contact materials, as disclosed in Japanese Patent Publication (KOKAI) No. 8-291306.

According to a second aspect of the invention, there is provided a double layered sintered contact element whose outermost sliding surface is made of the above-described copper-base sinter contact material. This reduces the use of the copper-base sinter contact material thereby saving costs. The double layered sintered contact element contains at least 1 wt % or more Sn in order to ensure bonding strength between the contact material and an iron-base metal backing. In order to lower sintering temperature, the preferable amount of Sn should not exceed 10 wt %.

The addition of P causes the generation of a liquid phase at low temperatures thereby accelerating sintering. To restrict excessive reaction with the iron-base metal backing, the amount of P is preferably adjusted so as not to exceed 1 wt %.

For bonding to the iron-base metal backing, a powder of the above copper-base sinter alloy is sprayed onto the surface of the iron-base metal backing and sinter bonding is then carried out in a neural or reducing atmosphere at at least not higher than 890° C. which is the eutectic temperature of Cu—Ti duel alloys. Thereafter, a pressurizing process such as rolling is carried out to form a copper-base sintered layer having desired density or thickness. Bending may be carried out at the same time. Then, the material is again sintered in the same atmosphere described above. The reason why the temperature of the first sintering operation is restricted to the eutectic temperature (890° C.) of Cu—Ti duel alloys or less is that a Ti compound precipitating at the joint interface between the contact material and the iron-base metal backing is restricted to thereby restrain the occurrence of exfoliation at the joint interface during the subsequent process of bending. Where the bending process is incorporated, the temperature of the second sintering operation is preferably 950° C. or less. Where the pressurizing process for density adjustment is carried out without the bending process, the preferable second sintering temperature is 890° C. or less and it is preferable to carry out sintering again at the target temperature of 950° C. or less after the second sintering operation.

Where a compact sheet which has undergone rolling or press molding is set on the iron-base metal backing for sintering, it is preferable that after sintering at a temperature of 890° C. or less, the composite material is bent and sintered again. The reason for this is that the precipitation of a Ti compound at the joint interface is restricted to prevent exfoliation as stated earlier.

According to a third aspect of the invention, when forming a double layered sintered contact element by integrally bonding the copper-base contact material containing Ti and Pb to the iron-base metal backing, a sintered insert layer may be interposed between them. With the provision of the sintered insert layer, the precipitation of the aforesaid compound at the joint interface can be further prevented in the bending process thereby increasing plastic deformability. As a result, the number of sintering operations can be reduced to increase productivity. In addition, not only improved bonding quality but also cost savings can be achieved.

The copper-base contact material used in the above double layered sintered contact element having the sintered insert layer may be a cast material or sinter contact material. As described earlier, it is apparent that a copper-base contact element having 10 to 70% holes on an area ratio basis can be produced at low cost. Additionally, the contact material, which has holes containing the above expansive copper-base sinter material sinter-bonded thereto, may be integrally adhered to the metal backing with the sintered insert layer between. This enables an inexpensive, double layered sinter-bonded contact element.

According to a forth aspect of the invention, the above-described sintered insert layer may be formed from an iron-base sinter material, thereby markedly reducing the cost of the material of the sintered insert layer. A preferable iron alloy used for making the sintered insert layer contains (i) an iron or iron alloy powder made by the reduction and/or atomizing method commonly used in ordinary metallurgy, as a major component; (ii) at least 20 to 60 wt % copper; and (iii) 2 to 7 wt % Sn. The iron alloy for the sintered insert layer preferably contains a component which generates a liquid phase having a lower-melting point such as Pb and P.

It should be noted that when the iron alloy for the sintered insert layer is sprayed onto the metal backing and then sinter bonding is carried out in the temperature range of 890° C. or less, not significant compaction but a slight amount of expansion is admitted and the structure after sintering has many voids formed by linked iron-base powder particles, resulting in a low apparent density. Where a bronze or phosphor-bronze sinter alloy is used for the sintered insert layer, the degree of sintering rapidly increases from 800° C. or more and the alloy is melted at an adequate sintering temperature for the copper-base sinter contact alloy of the invention containing Ti and a large amount of Pb, or the copper-base sinter contact material is significantly alloyed with the insert layer material so that the quality of the sliding contact layer cannot be controlled. For this reason, the above iron-base sinter material is used for the insert layer of the invention.

In addition, since the surface of the iron-base sintered insert layer is rough, when spraying a mixed powder of the copper-base sinter contact material onto the iron-base insert layer, spraying can be easily controlled so as to vary the thickness of the contact material layer. Where the thickness of the contact material layer is less than 0.5 mm, rolling can be directly performed after the spraying operation and therefore sintering can be advantageously successively carried out in the next process. This contributes to cost savings in the production of the double layered sintered contact element. Where the above thickness is 0.5 mm or more, such direct rolling after the spraying operation cannot be carried out and therefore it is preferable to carry out a pressing operation such as rolling during re-sintering to adjust the density and thickness of the material.

In the case of the double layered sintered contact element produced in the way described above, since the deformation resistance of the copper-base sinter contact material is much smaller than that of the iron-base insert layer material, the surface contact layer has high density and strength while the iron-base sintered insert layer can be made porous so that the resultant double layered sintered contact element has superior oil impregnation properties.

According to a fifth aspect of the invention, the porous sintered insert layer, which has been adjusted in thickness and bonded to a steel plate, is machined so as to be rugged and after the copper-base contact material is sprayed to the machined surface, rolling and re-sintering are carried out, whereby a low-cost double layered sintered contact element having low-density, high-oil-impregnation regions and high-density, low-oil-impregnation regions at the sintered contact layer can be obtained.

This material is intended for further enhancing the advantageous feature (i.e., porosity) of the above iron-base sintered insert layer. By machining the iron-base sintered insert layer to have convex portions and concave portions and spraying a mixed powder of the sinter contact material onto the rugged surface, the independent or linked concave portions are filled with a comparatively large amount of the contact material powder while the convex portions are slightly covered with the contact material powder. Then, rolling for obtaining a specified density or thickness is successively carried out like the above case and sintering is then carried out at 950° C. or less so that the double layered sintered contact element can be easily produced. This process for producing the double layered sintered contact element may be alternatively arranged such that, after a powder of the sintered contact material is sprayed onto the rugged surface, sintering is once carried out at 890° C. or less and followed by rolling for density and/or thickness adjustment and thereafter sintering is again carried out.

According to a six aspect of the invention, a mixed powder of the above copper-base and/or iron-base sinter contact material is compacted within a die under a specified pressure to form a tubular green compact; this green compact is inserted into a tubular iron-base metal backing; and sinter bonding is carried out to integrally form a double layered sintered contact element.

As described above, the inventors have developed a copper-base sinter contact material in which a Pb intermetallic compound is dispersed in the base and which contains Ti and Mg, thereby achieving a sinter contact material which has superior seizure resistance and more ability for withstanding wearing sliding conditions under high surface pressure, compared to the conventional high strength brass contact material and iron-base contact material, and which, further, has the capability of restraining abnormal noise even under severe lubricating conditions. The inventors also have developed a double layered sintered contact element formed from the above sinter contact material thereby achieving a low-cost sliding contact element having the aforesaid excellent features. Further, the inventors propose the provision of an iron-base insert layer between the above-described sinter contact material and an iron-base metal backing as well as the provision of low-density high-oil-impregnation copper-base sintered contact regions and high-density low-oil-impregnation copper-base sintered contact regions on the iron-base insert layer by making the surface of the insert layer rugged. With this arrangement, oil content can be increased and feeding of a lubricant to the high-density low-oil-impregnation copper-base sintered contact regions subjected to more severe lubricating conditions is facilitated to thereby achieve a highly seizure-resistant, low-cost double layered sintered contact element.

BRIEF DESCRIPTION OF THE DRAWINGS

FIG. 1 is a periodic table of Pb intermetallic compounds.

BEST MODE FOR CARRYING OUT THE INVENTION

Figure 2:
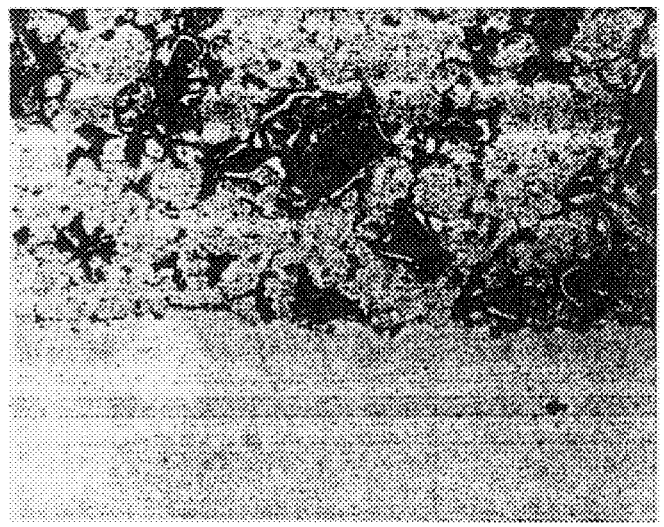
FIG. 2 shows microphotographs of metallographic structures each taken at an area close to the joint interface of an alloy and a metal backing.
Figure 2:
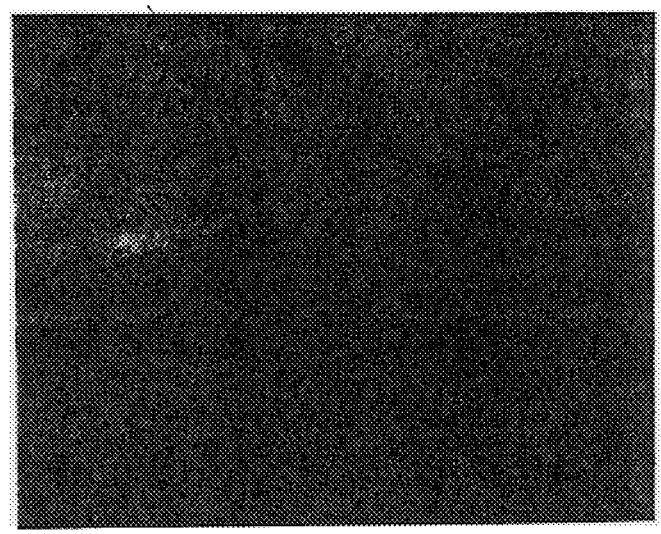
Figure 2:
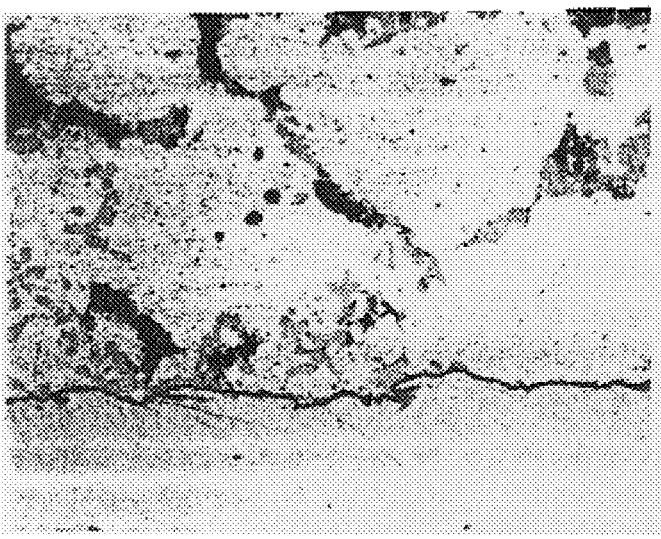

Referring now to the accompanying drawings, the contact materials, contact elements and contact element producing methods of the invention will be concretely described according to embodiments.

(Embodiment 1)

1) Development of copper-base sinter contact materials in which a Pb intermetallic compound is dispersedly precipitated TABLE 1 shows the compositions of copper-base sinter contact materials used in this embodiment and comparative materials. The materials of the invention were prepared in the following process. Mixed powders were prepared using an electrolytic copper powder (CE15), an LBC alloy atomized powder (Cu-10Sn-10Pb), a Cu-33Sn atomized powder, a Mg stamped powder, a Sn atomized powder, a Pb atomized powder, an Al atomized powder, a Cu-50 wt % Pb alloy atomized powder, TiH, $SiO_2$, phosphor iron (27 wt % P), a carbonyl Ni powder, a NiAl stamped powder, and a Si stamped powder. These mixed powders were respectively sprayed onto a S45C steel plate having a thickness of 5 mm, width of 150 mm and length of 1,000 mm and slightly ground with sand paper, so that a 10 mm-thick layer of each mixed powder was formed. These plates were then sinter bonded at 850 to 930° C. within a sintering furnace in an atmosphere of AX gas having a dew point of -35° C. or less. After the sprayed powder layer of each material was rolled into 3.0 mm, re-sintering was carried out at the same temperature, i.e., 850 to 930°C., thereby preparing a double layered sintered contact element.

TABLE 1

| COMPOSITIONS FOR ALLOYS | | | | | | | | | |
|---|---|---|---|---|---|---|---|---|---|
| No | Cu | Ti | Mg | Pb | Sn | Cu8P | Ni | NiAl | Si | Fe |
| 1 | Bal | 3 | | 3 | 8 | — | — | | — | — |
| 2 | Bal | 6 | | 5 | 2 | | | | | |
| 3 | Bal | 10 | | 5 | 2 | | | | | |
| 4 | Bal | 6 | | 10 | 2 | | | | | |
| 5 | Bal | 6 | | 5 | 2 | 6.25 | | | | |
| 6 | Bal | 6 | | 5 | 4 | | 5 | | | |
| 7 | Bal | 6 | | 5 | 4 | | | 3 | | |
| 8 | Bal | 6 | | 5 | 4 | | | | 2 | |
| 9 | Bal | 6 | | 10 | 10 | | | | | |
| 10 | Bal | 0.5 | 3 | 5 | 5 | | | | | |
| 11 | 40 | | 2 | 3 | 6 | | | | | Bal |
| 12 | 40 | | | 3 | 6 | | | | | Bal |
| COMPARATIVE SAMPLE 1 | Bal | — | — | — | 10 | 6.25 | — | | — | — | — |

TABLE 1-continued

COMPOSITIONS FOR ALLOYS

| No | Cu | Ti | Mg | Pb | Sn | Cu8P | Ni | NiAl | Si | Fe |
|---|---|---|---|---|---|---|---|---|---|---|
| COMPARATIVE SAMPLE 2 | Bal | — | — | 10 | 10 | — | — | — | — | — |
| COMPARATIVE SAMPLE 3 | HIGH STRENGTH BRASS (P31H PRODUCED BY CHUETSU METAL WORKS CO., LTD.) | | | | | | | | | |
| COMPARATIVE SAMPLE 4 | SCR420H (C:0.2, Cr:0.9, Mn:0.7, Si:0.24, Fe:Bal) | | | | | | | | | |

TABLE 2 shows the exfoliation states of the sintered layers of tubular bushings which were made from the contact materials listed in TABLE 1 through the following process. After each material was sinter bonded at each sinter bonding temperature shown in TABLE 2 and the sprayed powder layer was rolled into 3 mm as described above, re-sintering was carried out at the same sintering temperature to form a blank. Then, bending was performed to form a tubular bushing having a bore of 50 mm and length of 60 mm. To obtain each result, 20 samples were checked. As seen from TABLE 2, the sintered layers of the bushings sintered at 910° C. were significantly exfoliated.

TABLE 2

| | SINTERING TEMPERATURE | | | | |
|---|---|---|---|---|---|
| No | 850° C. | 870° C. | 885° C. | 910° C. | 930° C. |
| 1 | ○ | ○ | ○ | Δ | X |
| 2 | Δ* | ○ | ○ | X | X |
| 3 | Δ* | ○ | ○ | X | — |
| 4 | ○ | ○ | ○ | X | — |
| 5 | ○ | ○ | Δ | X | — |
| 6 | Δ* | ○ | ○ | X | — |
| 7 | ○ | ○ | ○ | X | — |
| 8 | ○ | ○ | ○ | X | — |
| 9 | ○ | ○ | ○ | X | — |
| 10 | ○ | ○ | ○ | — | — |
| COMPARATIVE SAMPLE 1 | ○ | ○ | FOAMED | — | — |
| COMPARATIVE SAMPLE 2 | ○ | FOAMED | FOAMED | — | — |

Δ*: PARTIAL EXFOLIATION DUE TO A SHORTAGE OF LIQUID PHASE

FIG. 2 microscopically shows the structure of alloy sample No. 2 listed in TABLE 1 in the vicinity of the joint interface with the metal backing when the alloy was sintered twice at temperatures of 885° C. and 910° C. FIG. 2 also shows the structure of alloy sample No. 9 in the vicinity of the joint interface with the metal backing when the alloy was sintered once at 870° C. It is understood from the result of alloy sample No. 2 that when an alloy liable to exfoliation is used, a Ti intermetallic compound is precipitated in the joint interface and this precipitation is a cause to the exfoliation at the joint interface. It is preferable to apply a bending process to a material in such a condition that a Ti intermetallic compound at about 890° C. or less is linked to the joint interface without precipitating. When a material having large amounts of Sn and Pb like alloy sample No. 9 is used, the liquid phase is generated in a considerable amount even in low-temperature sinter bonding at 850°C. Therefore, the material becomes highly dense in the first sinter bonding and, in some cases, in spite of the structure in which a Ti intermetallic compound is dispersed, the Ti intermetallic compound linked to the joint interface is not precipitated. It is understood from this fact that where Sn and Pb generate a large amount of liquid phase at lower temperatures in sinter bonding before Ti directly concerns with the liquid phase reaction, the precipitation of a Ti intermetallic compound linked to the joint interface between the contact material and the metal backing can be prevented.

When sintering alloy sample No. 2 at 890° C. or less, Ti powder is often alloyed insufficiently as seen FIG. 2 and the sliding properties of the material in this condition are undesirable for the reason explained later. Therefore, re-sintering is needed for sufficiently alloying Ti after the bending process in order to achieve improvements in seizure resistance due to a Pb intermetallic compound and in wear resistance due to the precipitation of a Ti intermetallic compound. Thus, when producing a tubular double layered sintered contact element, it is necessary to perform sintering after the bending process to precipitate a Ti intermetallic compound.

The same process as applied to the alloy samples of the invention was applied to comparative samples 1 and 2 at a sinter bonding temperature of 850° C. without carrying out re-sintering during the bending process. These samples then underwent the following sliding test.

Figure 3:
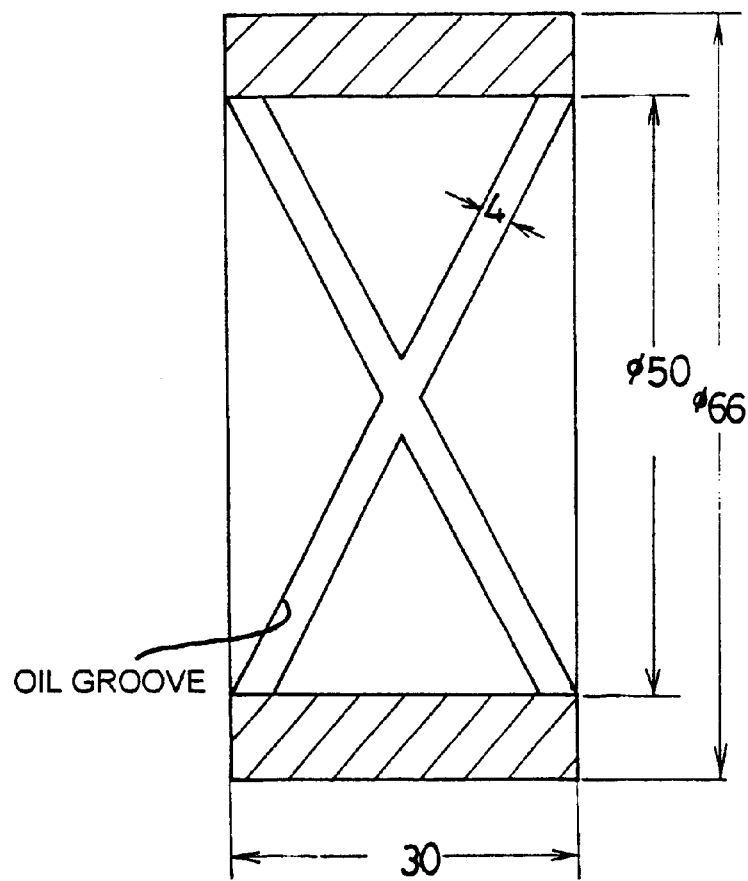
FIG. 3 is a sectional view of a specimen used in a sliding test.
Figure 4:
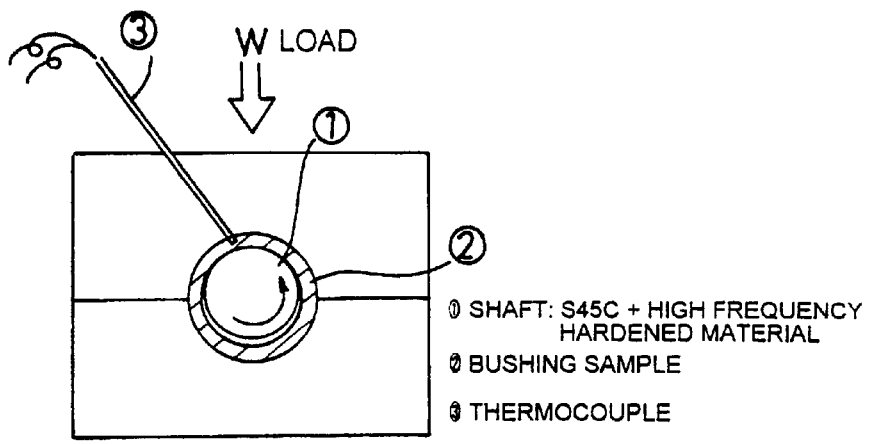
FIG. 4(a) is a conceptual view of a tester.
FIG. 4(b) shows test conditions.
Figure 4:
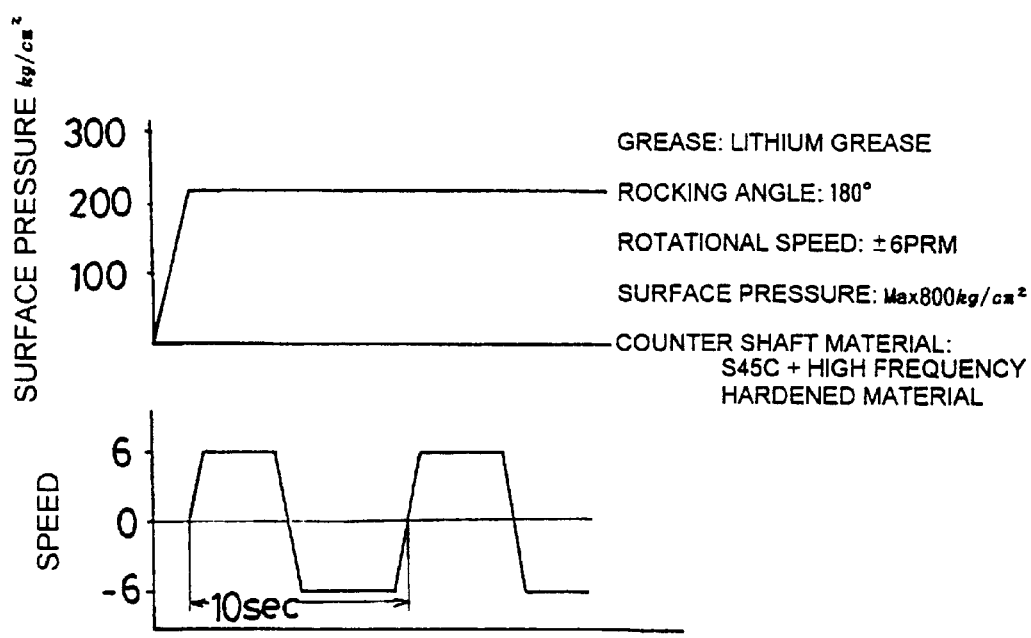

The configuration of the specimens used in the sliding test is shown in FIG. 3. The specimens have oil grooves in their bores. The conceptual view of the tester and the test conditions are shown in FIG. 4. For preparing a specimen, each sample was sinter bonded at 870° C. and then rolled. Subsequently, the second sintering was carried out at 870° C. and followed by a bending process. After the third sintering at 910° C., machining was carried out to obtain the configuration shown in FIG. 3. In the test, the oil grooves formed on the inner face of each bushing specimen were filled with lithium grease and the sliding surface was thin coated with lithium grease. After the bushing specimen was mounted on the tester, project surface pressure was raised by 100 kg/cm$^2$ until it reaches 800 kg/cm$^2$, while the bushing specimen was reciprocated in a sliding motion 1,000 times for every 100 kg/cm$^2$ rise in project surface pressure. When the specimen was seized causing a rapid increase in the coefficient of friction or when abnormal wear or abnormal noise occurred, the test was interrupted for evaluation.

Figure 5:
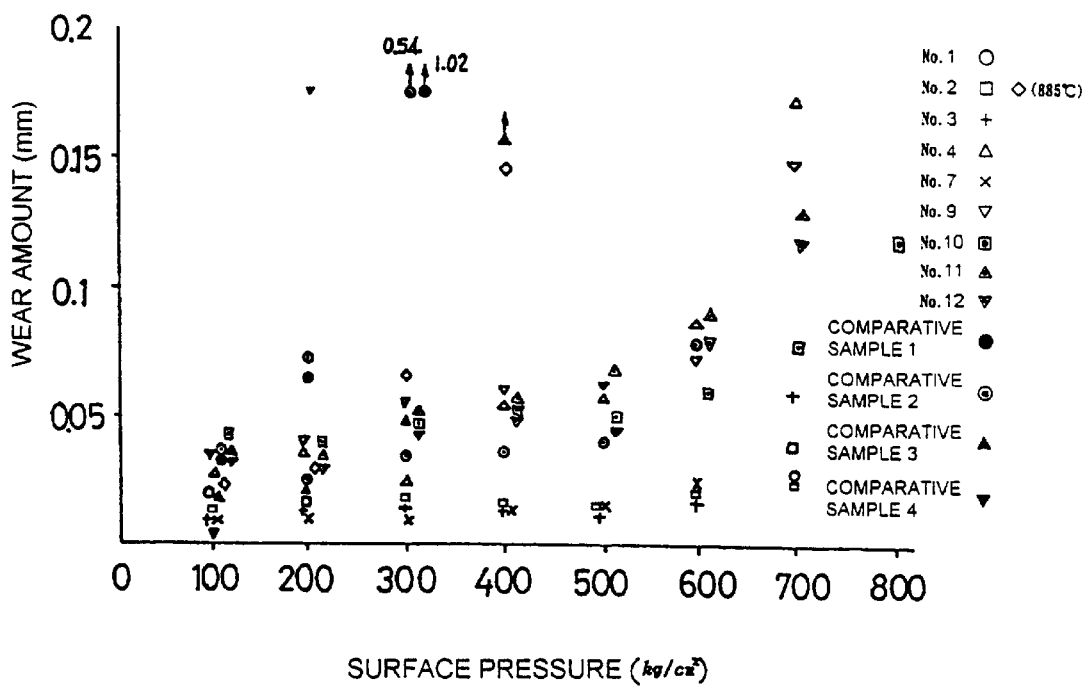
FIG. 5 shows the result of a sliding test conducted on each bushing.

FIG. 5 shows the surface pressures which the respective bushing specimens could sustain. It is obvious from the comparison that the bushings prepared according to the invention are superior to the bushings of the comparative samples. The carburized bushing run out of lubricant and generated abnormal noise from the time when the surface pressure reached 200 kg/cm$^2$. Comparative sample No. 3 of high strength brass generated abnormal noise under a surface pressure of 400 kg/cm$^2$ and comparative samples Nos. 1 and 2 caused abnormal wear under a surface pressure of 300 kg/cm$^2$.

The bushing sample, in which TiH powder remained in shape without forming an enough amount of a Ti intermetallic compound when sintered at 885° C. or less, also generated abnormal noise and started to seize under a surface pressure of 300 kg/cm$^2$ (marked with ◇ in FIG. 5).

The bushing formed from sample No. 10 containing Mg (sintering temperature =850° C.) exhibited sliding properties as good as those of the samples containing Ti from which it is understood that Mg has an effect common to alloy elements having the capability of forming a Pb intermetallic compound.

Double layered bushings formed by sintering the Fe-base sinter contact materials Nos. 11 and 12 containing Cu, Sn, Pb and Mg (preliminary sintering temperature and sintering temperature are both 880° C.) were tested. The Fe-base sinter contact materials proved to have effects similar to those of copper-base sinter contact materials, but in order to exert such effects, the Fe phase region susceptible to seizure should be sufficiently cut off by the copper phase region and therefore the volume of the Fe phase region in Fe-base materials is restricted to at least 60% by volume or less.
(Embodiment 2)

Figure 6:
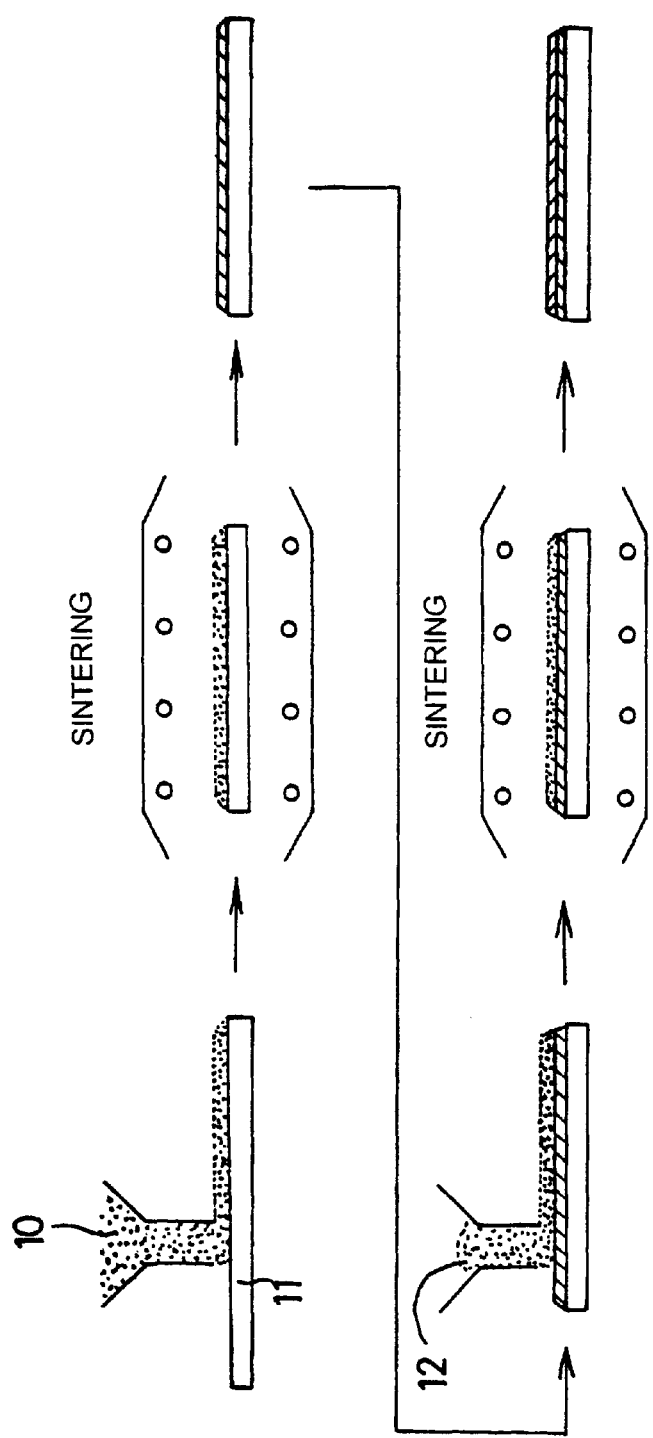
FIG. 6 illustrates a process for producing a double layered sintered contact element having an insert layer.
Figure 7:
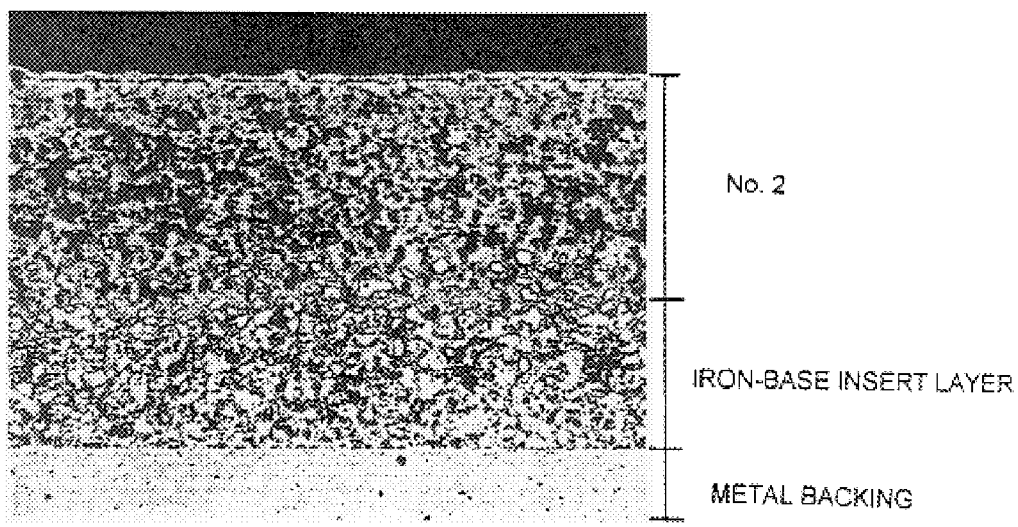
FIG. 7 shows a microphotograph of the metallographic structure of a double layered sintered contact member having an iron-base sintered insert layer made of alloy sample No. 22.

2) Development of a double layered sintered contact element having an insert layer TABLE 3 shows the compositions of alloy materials used for forming insert layers according to this embodiment. For preparing the mixed powders, KIP255 (a reduced iron powder produced by KAWASAKI STEEL CORPORATION), a Cu 25 wt % Pb atomized powder and the above raw material powders were used. As shown in FIG. 6, the mixed powders 10 (materials for an insert layer) of samples Nos. 21 to 24 were sprayed onto respective metal backings 11 to respectively form an insert layer of about 2 mm in thickness and then sinter bonded at 850 to 880° C. After that, the mixed powders 12 of the copper-base sinter contact materials Nos. 2 and 5 were sprayed onto the respective insert layers thereby respectively forming a 4 mm-thick layer. After re-sintering at 910° C., each composite material was rolled and bent into a tubular shape, thereby forming a bushing. It has been found that the possible exfoliation of the insert layer and the copper-base sintered contact material in the bending process can be completely prevented. In addition, the process of this embodiment is shorter than the double layered sintered contact element (bushing) fabrication process by sinter bonding each of the copper-base sinter contact materials described above to a metal backing, and cost savings can be achieved by the use of an iron-base alloy for a sintered insert layer. As reference, the metallographic structure of a contact element having a sintered insert layer is shown in FIG. 7.

TABLE 3

COMPOSITIONS FOR ALLOYS FOR INSERT LAYER (WT %)

| No | KIP255 | Cu  | Pb | Sn | P    |
|----|--------|-----|----|----|------|
| 21 | Bal    | 15  | 10 | 3  |      |
| 22 | Bal    | 30  | 3  | 5  |      |
| 23 | Bal    | 30  | 10 | 5  |      |
| 24 |        | Bal |    | 10 | 0.5* |

*Fe27P IS USED

Figure 8:
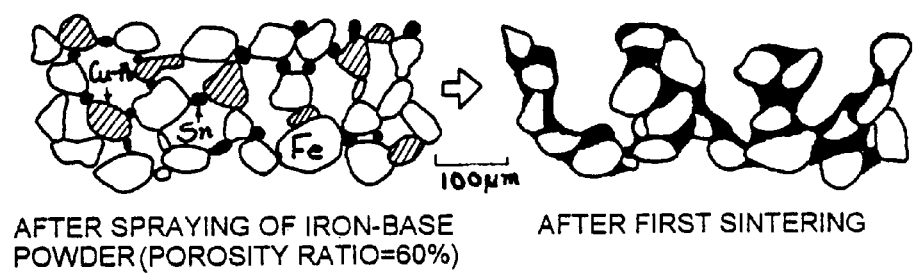
FIG. 8 diagrammatically illustrates how the surface of a sinter bonded insert layer coarsens.

FIG. 8 diagrammatically shows how the surface of the sinter bonded insert layer coarsens considerably. The copper-base sinter contact material powder sprayed over the insert layer falls in the large voids so that the powder is prevented from escaping during the rolling process. This makes it possible to carry out the above-described direct rolling just after spraying the copper-base sinter contact material mixed powder onto the sintered insert layer. In this embodiment, the thickness of the copper-base contact material layer which enables direct rolling was checked. In this check, the metal powders used for preparing the copper-base sinter contact material powders were atomized powders except TiH. As a result, it was found that the suitable thickness of the copper-base contact material layer after sintering was approximately 1.0 mm.

In cases where a thicker layer of a copper-base sinter contact material is formed, there are difficulties in performing the above direct rolling and therefore re-sintering, rolling and roll-bending need to be carried after spraying of the copper-base sinter contact material onto the insert layer.
(Embodiment 3)

3) Development of a density division type doubled-layered sintered contact element having an insert layer More adequate double layered sintered contact elements can be developed by using Pb containing iron-base sinter contact materials (such as alloy samples Nos. 21, 22, 23 of TABLE 3) as an iron-base sinter material for an insert layer. Such Pb containing iron-base materials have better wear resistance under low-speed, high-load conditions, compared to LBC sinter contact materials.

Figure 9:
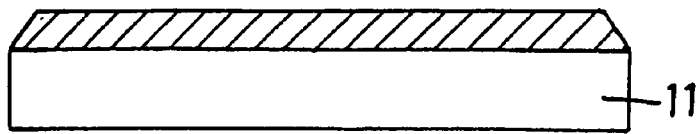
FIGS. 9(a) to 9(c) show a process of producing a double layered sintered contact element having an insert layer.
Figure 9:
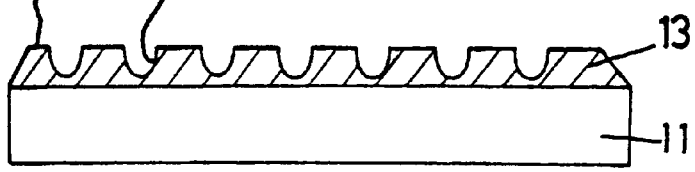
Figure 9:
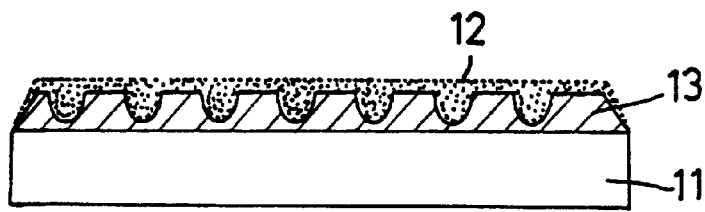
Figure 9:
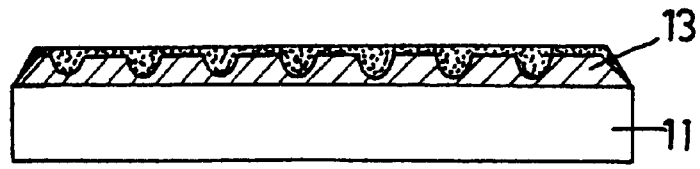

The fabrication process of this embodiment is similar to the above-described process for fabricating the iron-base insert layer. Specifically, the process of this embodiment comprises, as shown in FIG. 9, the following steps: (a) a mixed powder is sprayed to a metal backing 11 to form an 8-mm thick insert layer and then sinter bonded at 880° C.; (b) convex portions and concave portions (i.e., ruggedness) are formed by pressure molding; (c) a copper-base sinter contact material powder 12 is sprayed onto the insert layer 13 such that the concave portions are filled with larger amounts of the copper-base sinter contact material powder 12; (d) rolling, sintering at 910° C. and bending are sequentially carried out. In this double layered sintered contact element, high density regions are formed from the above copper-base sinter contact material having excellent sliding properties while low density regions are formed from the iron-base insert sinter contact material and/or thin covered with the above copper-base sinter contact material. Since this element has high oil content, the high density regions which have to sustain most of load are effectively lubricated. In addition, the use of the above, expensive, copper-base sinter contact materials can be dramatically reduced and the fabricating process can be simplified, which, in consequence, leads to significant cost savings.

Figure 10:
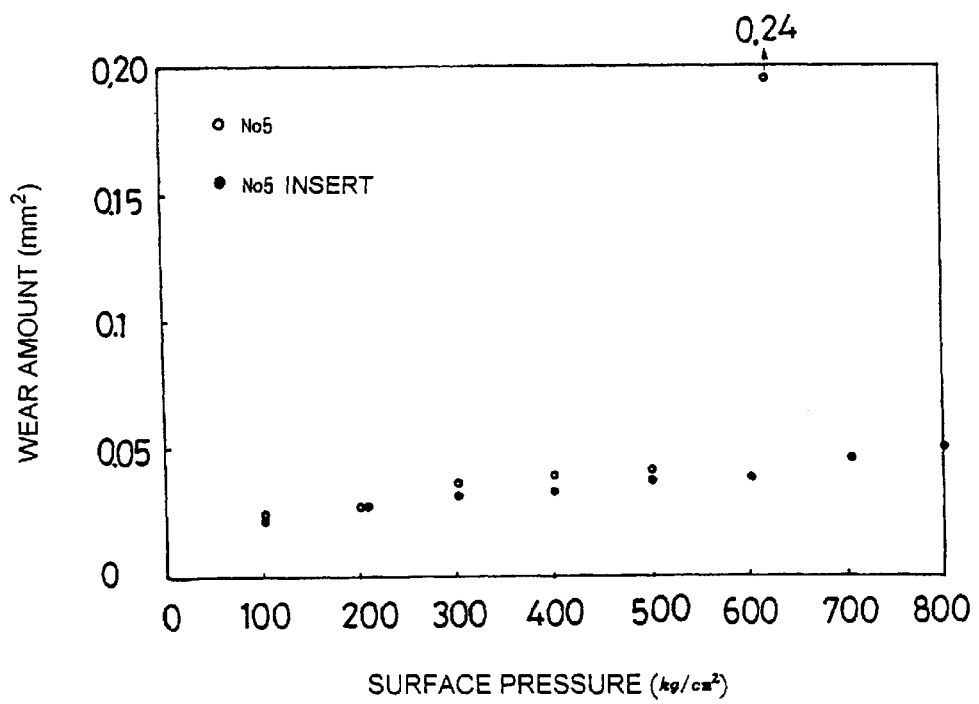
FIG. 10 shows the result of a sliding test conducted on a double layered sintered contact element having an iron-base insert layer.

The sliding property of the double layered sintered contact element according to Embodiment 3 was checked in comparison with the element of Embodiment 1, by the same sliding test as described earlier. The element of Embodiment 3 was prepared by using the copper-base contact material No. 5 and the iron-base insert material No. 21 while the element of Embodiment 1 was prepared by use of the copper-base contact material No. 5. The result is shown in FIG. 10 from which it is understood that the bushing of Embodiment 3 having the low density sintered regions is improved over the bushing of Embodiment 1 in surface pressure resistance.
(Embodiment 4)

4) Development of a double layered sinter bonded contact element having an insert layer Alloy sample No. 2 shown in TABLE 1 was high-frequency melted in an atmosphere of Ar gas and then cast in a die to form a cast copper-base contact element having a thickness of 1.0 mm, width of 70 mm and length of 300 mm. This cast material was sinter bonded to a metal backing through a sintered insert layer, similarly to Embodiment 2. As the material for the sintered insert layer, samples Nos. 22 and 24 (see TABLE 3) were respectively used.

The fabrication process will be more concretely described. Each powder material for a sintered insert layer was sprayed onto the metal backing to form a layer of 2.0 mm in thickness and then preliminary sintering was carried out in the AX gas furnace. The preliminary sintering temperatures for samples Nos. 22 and 24 were 850° C. and 830° C., respectively. After preliminary sintering, the material was rolled thereby preparing a composite body having a 0.7 mm-thick sintered insert layer. Another composite body was prepared by spraying a Cu-10Pb-10Sn atomized powder of #300 mesh under onto the preliminary sintered insert layer, smoothing the surface to form a layer of 0.1 mm, and then rolling the material to obtain an insert layer having a thickness of 0.7 mm. Then, the above cast copper-base contact material was placed on and sinter bonded to the respective composite bodies at 880° C. Subsequently, bending was carried out similarly to Embodiment 1 to form tubular bushings. The exfoliation of these tubular bushings was checked and all the bushings were found to be in good bonding conditions without exfoliation at the joint between the contact materials and the backings. When the bonding condition of each bushing was checked by ultrasonic flaw detection, it was found that the bushing prepared by spraying Cu-10Pb-10Sn powder had less defects so that this method is preferable to the other.

Figure 11:
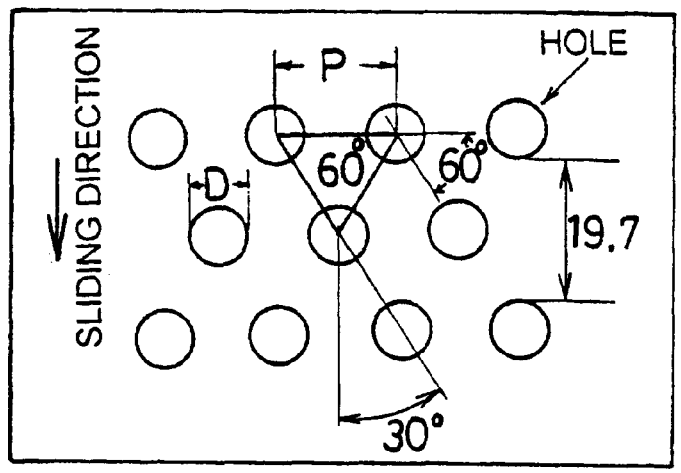
FIG. 11 shows one example of contact elements subjected to punching.

The cast copper-base contact material punched so as to have holes as shown in FIG. 11 was placed on an insert layer made of sample No. 22, and the holes were filled with a Cu-1Al-10Sn-5Pb mixed powder. After sinter bonding was carried out at 880° C. like the above case, bending was carried out to form a tubular bushing. This bushing was checked in terms of the quality of bonding between the contact material and the metal backing and in terms of the bonding condition of the porous sintered body formed within the holes, and good results were obtained.

Figure 12:
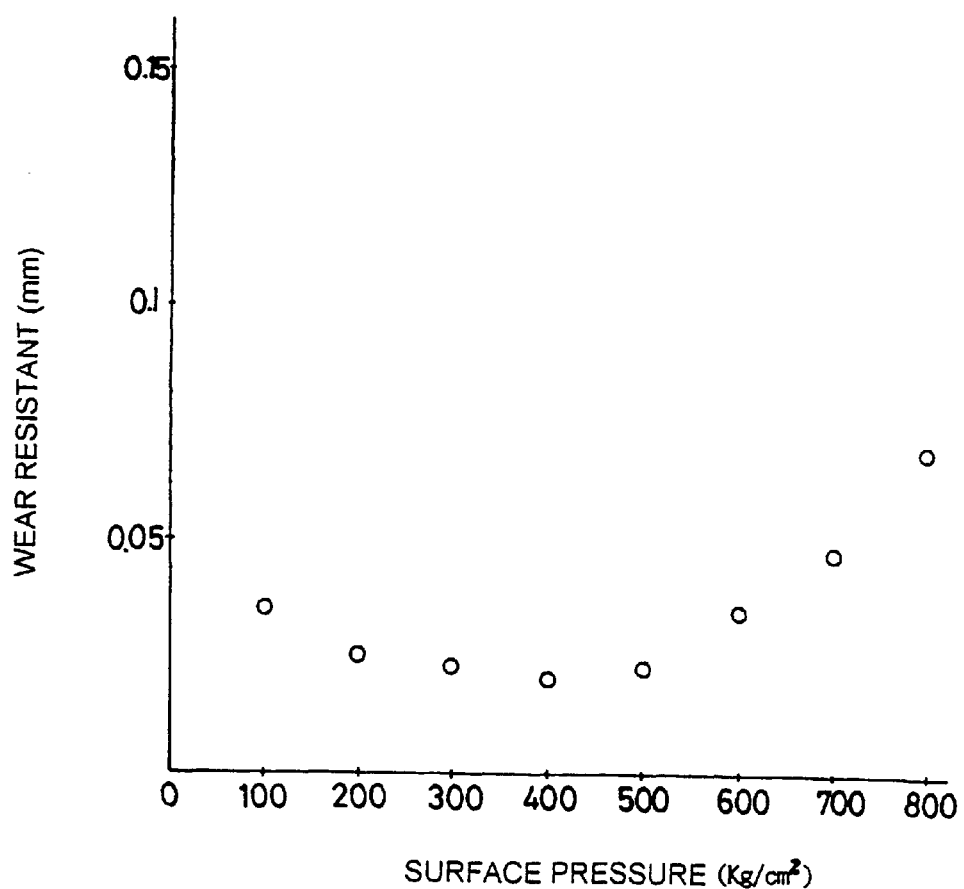
FIG. 12 shows the result of a sliding test conducted on each bushing.
Figure 13:
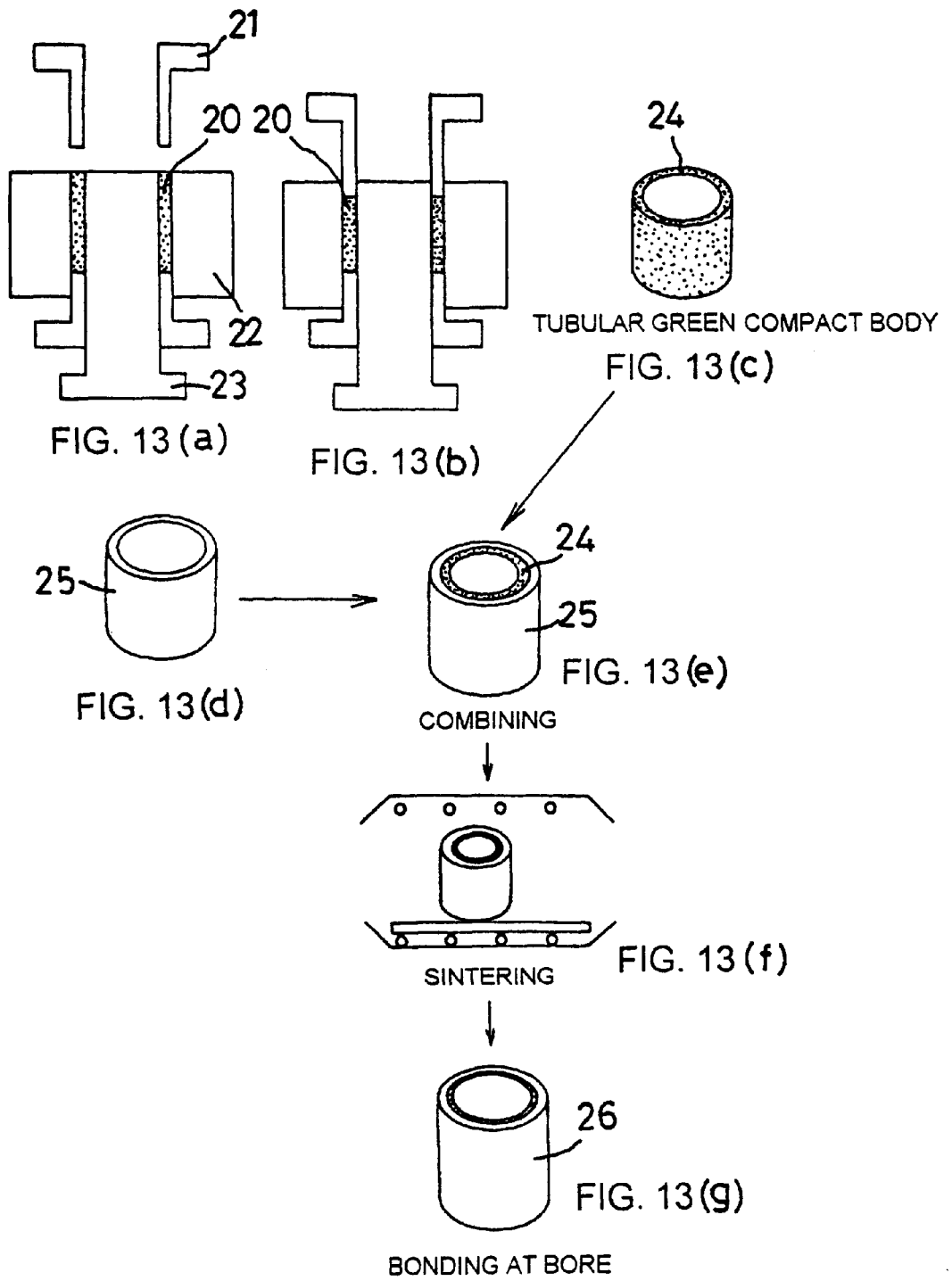
FIGS. 13(a) to 13(g) show a process of producing a double layered sintered contact element in which a steel pipe is used as a metal backing.

The same sliding test as made in Embodiment 1 was conducted on each bushing. FIG. 12 shows the test result. Oil grooves were not formed in the cast contact element provided with holes but it proved to have excellent properties by virtue of the lubricating effect of oil impregnated porous body embedded in the holes.

The contact element shown in FIG. 11, to which a punching metal process (hole making process) has been applied, has excellent performance not with standing that it has not undergone a grooving process. This is obviously attributable to the oil impregnating effect of the porous sintered body sinter-bonded to the holes. It is also obvious that such good performance can be ensured even when the contact element is formed without integrally bonding a metal backing.

In addition, in the case where the porous sintered body is formed by sinter bonding in the holes made by the punching metal process, this arrangement has the significant effect of preventing the possible irregular deformation of the contact material when bent into a tubular bushing, and as a result, the percent defective in the fabrication of bushings can be decreased and the costs of the subsequent processes can be saved.

(Embodiment 5)

5) A method for producing a double layered sintered contact element using an iron-base pipe material as a metal backing As shown in FIGS. 13(a) to 13(g), a mixed powder 20 having the same composition as sample No. 7 shown in TABLE 1 is molded into a tubular green compact body 24 under a pressure of 3t to 7t/cm² within a molding unit composed of a punch 21, die 22 and center core 23. Then, the tubular green compact body 24 is inserted into an iron-base pipe 25. At that time, the clearance between the iron-base pipe 25 and the tubular green compact body 24 is 0.2 to 0.5 mm. Thereafter, the composite body of the iron-base pipe 25 and the tubular green compact body 24 is held within a heating furnace under an atmosphere of ammonia cracked gas (dew point =−40° C.) at a temperature of 910° C. for 60 minutes and then cooled by gas, so that the expansion behavior of the mixed powder containing a Cu—Sn alloy is promoted, increasing the bonding strength of the mixed powder 20 with respect to the iron-base pipe 25. By holding the composite body in a cooled condition, the state of the mixed powder 20 changes from the expansion behavior to a contraction behavior so that the tubular green compact body 24 is compacted and diffusion bonded to the inside of the iron-base pipe 25. In this way, a double layered sintered contact element 26 composed of the pipe material and the sintered layer integrally bonded to each other can be obtained.

Figure 14:
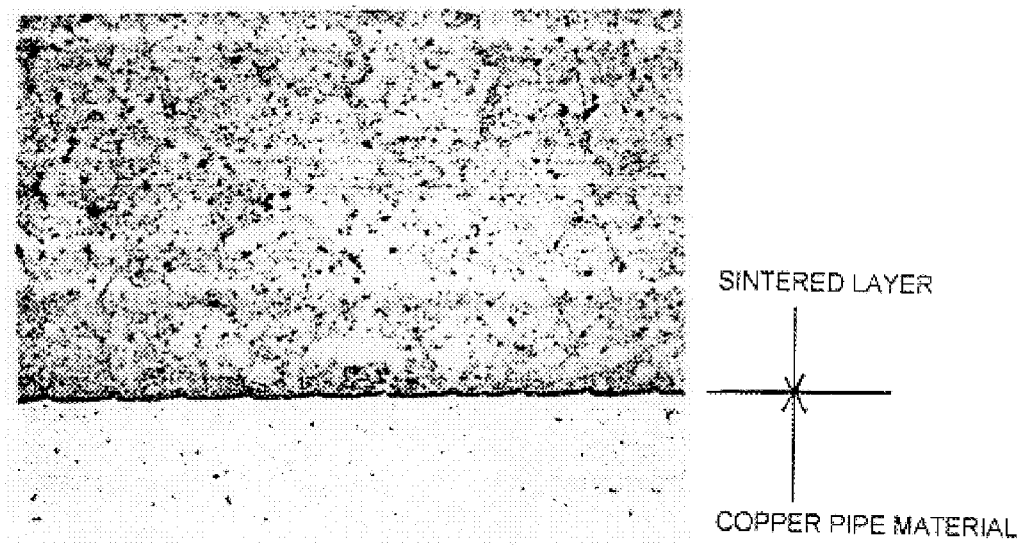
FIG. 14 is a microphotograph showing the metallographic structure of a double layered sintered contact element prepared in Embodiment 5.

FIG. 14 shows a microphotograph of the metallographic structure of the above double layered sintered contact element. As seen from this photograph, the quality of bonding between the contact material and the iron-base pipe material serving as a metal backing is good.

A sliding test on the above tubular element was conducted using the tester shown in FIG. 4 and it was found that the tubular element had sliding properties as good as those of the contact elements having an iron-base metal backing. The iron-base pipe material described herein includes sintered pipe material, steel pipe material and cast pipe material.

What is claimed is:

1. A method for producing a copper-base contact element by casting a copper-base contact material or by sintering a metal powder and/or alloy powder of the copper-base contact material under a reducing, neutral and/or vacuum atmosphere, said copper-base contact material being a Cu alloy containing 1 to 30 wt % Pb and at least 0.5 to 10 wt % of one or more elements selected from Ti and Mg which form a Pb intermetallic compound when reacting with Pb; and said copper-base contact material containing one or more alloy elements selected from Sn, Pb, Zn, Al, Si, P, Fe, Be, Ag, Mn and Cr.

2. A method for producing a copper-base contact element according to claim 1, wherein 10 to 70% holes on an area ratio basis are formed, and a bronze-base sinter material mixed powder is introduced into the holes and sintered, thereby forming a porous sintered body which has a porosity ratio of 20 to 70% by volume and is sinter bonded to the hole portions, so that oil impregnation capacity is increased, said bronze-base sinter material being expandable by sintering, and containing one or more elements selected from Al, Si and Cr in the form of a metal powder and/or alloy powder.

3. A method for producing an iron-base sintered contact element, by sintering an iron-base contact material which contain (i) 30 to 60% by volume of a Cu alloy phase containing 1 to 30 wt % Pb and 0.5 to 10 wt % of one or more elements selected from Ti and Mg which form a Pb intermetallic compound when reacting with Pb; (ii) 2 to 10 wt % Sn; and (iii) balance predominantly constituted by Fe.

4. A method for producing an iron-base sintered contact element according to claim 3, wherein 10 to 70% holes on an area ratio basis are formed, and a bronze-base sinter material mixed powder is introduced into the holes and sintered, thereby forming a porous sintered body which has a porosity ratio of 20 to 70% by volume and is sinter bonded to the hole portions, so that oil impregnation capacity is increased, said bronze-base sinter material being expandable by sintering, and containing one or more elements selected from Al, Si and Cr in the form of a metal powder and/or alloy powder.

5. A method for producing a double layered sintered contact element by integrally sinter-bonding the copper-base or iron-base sintered contact element set forth in any one of claims 1 or 4 to an iron-base metal backing.

6. A method for producing a double layered sintered contact element according to claim 5, comprising the steps of: (i) spraying a sintered insert layer material powder onto the iron-base metal backing; (ii) carrying out preliminary sintering to form a sintered insert layer; (iii) further spraying a copper-base and/or iron-base sinter contact material powder onto the sintered insert layer prior to re-sintering; and (iv) applying a rolling process to the composite body of the backing and the insert layer and contact material layer, or comprising the steps of: (i) spraying a sintered insert layer material powder onto the iron-base metal backing; (ii) carrying out preliminary sintering to form a sintered insert layer; (iii) rolling the composite body of the sintered insert layer and the backing; and (iv) spraying a copper-base and/or iron-base contact material powder onto the sintered insert layer prior to re-sintering and re-rolling, whereby the sintered insert layer is interposed in an integral fashion between the contact material and the iron-base metal backing.

7. A method for producing a double layered sintered contact element with oil holes, wherein an integral sintered insert layer is interposed between a copper-base and/or iron-base contact material and an iron-base metal backing, the method comprising the steps of: (i) spraying a sintered insert layer material powder onto the iron-base metal backing and preliminarily sintering the material powder to form a sintered inset layer; (ii) rolling the composite body of the metal backing and the sintered insert layer; (iii) placing, on the sintered insert layer, a cast copper-base contact material or a copper-base and/or iron-base sintered contact material having 10 to 70% holes on an area ratio basis; and (iv) making the contact material integral with the iron-base metal backing by sinter bonding.

8. A method for producing a double layered sintered contact element according to claim 7, wherein after the copper-base contact material having holes is placed on the sintered insert layer, the holes are filled with a copper-base sinter material powder expandable by sintering and containing one or more elements selected from Al, Si, Mn and Cr in the form of a metal powder and/or alloy powder, and sintering is subsequently carried out to form a porous sintered body within the holes so as to be sinter-bonded to the copper-base contact material.

9. A method for producing a double layered sintered contact element according to claim 6, wherein after the preliminarily sintered insert layer and the copper-base and/or iron-base sintered contact material are made rugged, a copper-base sinter contact material powder is sprayed onto the rugged surface, and then, rolling and re-sintering or re-sintering and rolling is carried out.

10. A method for producing a double layered sintered contact element according to claim 6, wherein said sintered insert layer material contains Fe as a major component, at least 15 to 60 wt % Cu, 2 to 7 wt % Sn and 1 to 10 wt % Pb.

11. A method for producing a double layered sintered contact element comprising the steps of: compacting a mixed powder of a copper-base and/or iron-base sinter contact material containing one or more Pb intermetallic compounds dispersed and precipitated therein within a die under a specified pressure to form a tubular green compact body; inserting the tubular green compact body into a tubular iron-base metal backing; and sinter bonding the green compact body and the metal backing so as to be integral with each other.

12. A method for producing a double layered sintered contact element according to claim 7, wherein after the preliminary sintered insert layer and the copper-base and/or iron-based sintered contact material are made rugged, a copper-base sinter contact material powder is sprayed onto the rugged surface, and then, rolling and re-sintering or re-sintering and rolling is carried out.

13. A method for producing a double layered sintered contact element according to claim 7, wherein said sintered insert layer material contains Fe as a major component, at least 15 to 60 wt % Cu, 2 to 7 wt % Sn and 1 to 19 wt % Pb.

* * * * *